United States Patent
Pawley

(10) Patent No.: US 8,844,693 B2
(45) Date of Patent: Sep. 30, 2014

(54) COUPLING ASSEMBLY HAVING AN OVERRUN MODE AND RATCHETING REVERSE STRUT OR RADIAL RATCHET FOR USE THEREIN

(75) Inventor: Brice A. Pawley, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 174 days.

(21) Appl. No.: 13/611,001

(22) Filed: Sep. 12, 2012

(65) Prior Publication Data

US 2013/0062151 A1 Mar. 14, 2013

Related U.S. Application Data

(60) Provisional application No. 61/533,877, filed on Sep. 13, 2011.

(51) Int. Cl.
*F16D 41/12* (2006.01)

(52) U.S. Cl.
CPC .................................. *F16D 41/125* (2013.01)
USPC .......... 192/46; 192/69.1; 192/104 B; 192/108

(58) Field of Classification Search
USPC .................. 192/69.1, 108; 74/576, 577 S
See application file for complete search history.

(56) References Cited

U.S. PATENT DOCUMENTS

| | | |
|---|---|---|
| 4,200,002 A | 4/1980 | Takahashi |
| 5,070,978 A | 12/1991 | Pires |
| 5,449,057 A | 9/1995 | Frank |
| 5,597,057 A | 1/1997 | Ruth et al. |
| 5,806,643 A | 9/1998 | Fitz |
| 5,871,071 A | 2/1999 | Sink |
| 5,918,715 A | 7/1999 | Ruth et al. |
| 5,927,455 A | 7/1999 | Baker et al. |
| 5,954,174 A | 9/1999 | Costin |
| 5,964,331 A | 10/1999 | Reed et al. |
| 5,979,627 A | 11/1999 | Ruth et al. |
| 6,065,576 A | 5/2000 | Shaw et al. |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,244,965 B1 | 6/2001 | Klecker et al. |
| 6,386,349 B1 | 5/2002 | Welch |
| 6,481,551 B1 | 11/2002 | Ruth |
| 6,505,721 B1 | 1/2003 | Welch |
| 6,571,926 B2 | 6/2003 | Pawley |
| 6,854,577 B2 | 2/2005 | Ruth |

(Continued)

OTHER PUBLICATIONS

International Search Report and Written Opinion; International application No. PCT/US12/55022; date of mailing Dec. 7, 2012.

(Continued)

*Primary Examiner* — Rodney H Bonck
(74) *Attorney, Agent, or Firm* — Brooks Kushman P.C.

(57) ABSTRACT

A coupling assembly having an overrun mode and a ratcheting reverse strut or radial ratchet for use in the assembly are provided. The size and shape of the strut or ratchet and corresponding notches (i.e. geometry) of a notch plate of the assembly are specifically configured so that the strut or ratchet "ratchets" during the overrun condition. The strut or ratchet will not engage the notch plate until relative notch plate speed drops below a predetermined speed.

12 Claims, 4 Drawing Sheets

(56) References Cited

U.S. PATENT DOCUMENTS

| | | |
|---|---|---|
| 7,025,188 B2 | 4/2006 | Lindenschmidt et al. |
| 7,258,214 B2 | 8/2007 | Pawley et al. |
| 7,344,010 B2 | 3/2008 | Fetting, Jr. et al. |
| 7,455,156 B2 | 11/2008 | Kimes et al. |
| 7,455,157 B2 * | 11/2008 | Kimes et al. .................... 192/46 |
| 7,484,605 B2 | 2/2009 | Pawley et al. |
| 7,661,518 B2 * | 2/2010 | Kimes ............................ 192/46 |
| 7,980,372 B2 | 7/2011 | Wiesneth et al. |
| 2008/0169165 A1 | 7/2008 | Samie et al. |
| 2009/0159391 A1 | 6/2009 | Eisengruber |
| 2010/0288592 A1 | 11/2010 | Papania et al. |

OTHER PUBLICATIONS

International Preliminary Report on Patentability; International application No. PCT/US2012/055022; date of issuance of report Mar. 18, 2014.

* cited by examiner

COUPLING ASSEMBLY HAVING AN OVERRUN MODE AND RATCHETING REVERSE STRUT OR RADIAL RATCHET FOR USE THEREIN

CROSS-REFERENCE TO RELATED APPLICATIONS

This application claims the benefit of U.S. provisional Application No. 61/533,877 filed Sep. 13, 2011 and having the same title as this application. The disclosure of the provisional application is incorporated in its entirety by reference herein.

TECHNICAL FIELD OF THE INVENTION

This invention relates in general to the field of coupling assemblies having an overrun mode and ratcheting reverse struts or radial ratchets for use therein.

OVERVIEW

Overrunning coupling assemblies may be used for transferring torque from a driving member to a driven member in a variety of structural environments. This permits the transfer of torque from a driving member to a driven member while permitting freewheeling motion of the driving member relative to the driven member when torque is interrupted. Such couplings often comprise an outer race concentrically disposed with respect to an inner race, the outer race having cammed surfaces that define a pocket in which coupling rollers are assembled.

A driving member is connected to one race, and a driven member is connected to the other race. During torque transfer from the driving member to the driven member, the rollers become locked with a camming action against the cam surfaces, thereby establishing a positive driving connection between the driving member and the driven member. When the torque is interrupted, the driven member may freewheel relative to the driving member as the rollers become unlocked from their respective cam surfaces.

Another common overrunning coupling includes inner and outer races wherein one race is connected to a driving member and the other race is connected to the driven member. Overrunning coupling sprags are disposed between the inner cylindrical surface of the outer race and the outer cylindrical surface of the inner race so that the sprags lock the races together as torque is delivered to the driven member. The sprags become unlocked with respect to the inner and outer race surfaces when torque transfer is interrupted.

For purposes of this disclosure, the term coupling should be interpreted to include clutches or brakes wherein one of the plates is drivably connected to a torque delivery element of a transmission and the other plate is drivably connected to another torque delivery element or is anchored and held stationary with respect to a transmission housing. The terms coupling, clutch and brake may be used interchangeably.

A pocket plate may be provided with angularly disposed recesses or pockets about the axis of a one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Other U.S. patents related to the present invention include: U.S. Pat. Nos. 5,070,978; 5,449,057; 5,806,643; 5,871,071; 5,918,715; 5,964,331; 5,927,455; 5,979,627; 6,065,576; 6,116,394; 6,125,980; 6,129,190; 6,186,299; 6,193,038; 6,244,965; 6,386,349; 6,481,551; 6,505,721; 6,571,926; 6,854,577; 7,258,214; 7,344,010; and 7,484,605.

Yet still other related U.S. patents include: U.S. Pat. Nos. 4,200,002; 5,954,174; and 7,025,188.

Normally the desire is to keep the ratcheting reverse struts or radial ratchets of a controllable or selectable one-way clutch covered by a selector plate to keep them from engaging the notch plate of the clutch. If the reverse struts or ratchets are exposed during overrun they can lock to the notch plate. When this happens above a predetermined RPM such as approximately 200 RPM, the results can be a broken clutch and the vehicle owner is left with a broken transmission.

In other words, a potential failure condition occurs when a slide or selector plate is shifted or moved during the overrun mode or state, exposing the one or more reverse struts or ratchets to engagement with the notch plate at high speed.

SUMMARY OF EXAMPLE EMBODIMENTS

An object of at least one embodiment of the present invention is to provide a coupling assembly having an overrun mode and a reverse strut or radial ratchet for use therein, wherein an uncovered or exposed reverse strut or radial ratchet does not engage a first member of the assembly until a predetermined "low" RPM is reached. At this "low" RPM, the assembly will not break during overrun mode of the assembly if engagement occurs. The most severe condition might be a driver or occupant of the vehicle feeling a harsh shift.

In one embodiment, a coupling assembly having an overrun mode is provided. The assembly includes first and second members including first and second coupling faces, respectively, in close-spaced opposition with one another. The first coupling face defines a reference surface. At least one of the members is mounted for rotation about an axis. The first coupling face has a plurality of recesses. Each of the recesses defines a load-bearing first shoulder and a ramped surface adjacent the first shoulder. The ramped surface includes a convex surface portion that tangentially intersects the reference surface. The second coupling face has at least one recess defining a load-bearing second shoulder. The assembly further includes a reverse strut or radial ratchet disposed between the coupling faces of the members. The strut or ratchet is movable between first and second positions. The first position is characterized by abutting engagement of the strut or ratchet with a respective shoulder of each member. The second position is characterized by a non-abutting engagement of the strut or ratchet with at least one of the members. The assembly still further includes a control element mounted for controlled movement between the coupling faces and operable to control position of the strut or ratchet. The control element has at least one opening which extends completely therethrough to allow the strut or ratchet to extend therethrough to the first position in a control position of the control element. The convex surface portions are operative to periodically urge the strut or ratchet towards the second position upon rotation of the first member in a first direction relative to the second member above a predetermined RPM to prevent the abutting engagement of the strut or ratchet in the overrun mode.

The predetermined RPM may be about 200 RPM.

The control element may be a control or selector plate rotatable about the axis.

The reference surface may be generally normal to the axis.

The load-bearing first shoulder of each recess of the first member may tangentially intersect its corresponding convex surface portion.

One of the members may be a switch plate and the other of the members may be a pocket plate.

The assembly may be a controllable or selectable one-way clutch assembly.

In another embodiment, a coupling assembly having an overrun mode is provided. The assembly includes first and second members including first and second coupling faces, respectively, in close-spaced opposition with one another. The first coupling face defines a reference surface. At least one of the members is mounted for rotation about an axis. The first coupling face has a plurality of recesses. Each of the recesses defines a load-bearing first shoulder and a ramped surface adjacent the first shoulder. The ramped surface includes a convex surface portion that tangentially intersects the reference surface. The second coupling face has at least one recess defining a load-bearing second shoulder. The assembly further includes a strut or radial ratchet disposed between the coupling faces of the members. The strut or ratchet is movable between first and second positions. The first position is characterized by abutting engagement of the strut or ratchet with a respective shoulder of each member. The second position is characterized by a non-abutting engagement of the strut or ratchet with at least one of the members. The convex surface portions are operative to periodically urge the strut or ratchet towards the second position upon rotation of the first member in a first direction relative to the second member above a predetermined RPM to prevent the abutting engagement of the strut or ratchet in the overrun mode.

In yet another embodiment, a coupling assembly having an overrun mode is provided. The assembly includes first and second members including first and second coupling faces, respectively, in close-spaced opposition with one another. The first coupling face defines a reference surface. At least one of the members is mounted for rotation about an axis. The first coupling face has a plurality of recesses. Each of the recesses defines a load-bearing first shoulder and a ramped surface adjacent the first shoulder. The ramped surface includes a convex surface portion that tangentially intersects the reference surface. The second coupling face has at least one recess defining a load-bearing second shoulder. The assembly further includes a reverse strut or radial ratchet disposed between the coupling faces of the members. The strut or ratchet is movable between first and second positions. The first position is characterized by abutting engagement of the strut ratchet with a respective shoulder of each member. The second position is characterized by a non-abutting engagement of the strut or ratchet with at least one of the members. The strut or ratchet includes a first end surface at a free end of the strut or ratchet, a second end surface at a shoulder-engaging end of the strut or ratchet diametrically opposite the first end surface and an upper face which defines a ramped surface including a convex surface portion which tangentially intersects the first end surface. The convex surface portions of the first member and the strut or ratchet are operative to periodically urge the strut or ratchet towards the second position upon rotation of the first member in a first direction relative to the second member above a predetermined RPM to prevent abutting engagement of the first end surface of the strut or ratchet with the shoulder of the first member in the overrun mode.

The assembly may further include a biasing member carried by the second member to urge the strut or ratchet toward the first position.

In a strut or ratchet embodiment, a reverse strut or radial ratchet for a coupling assembly is provided. The strut or ratchet includes a first end surface at a free end of the strut or ratchet. The strut or ratchet further includes a second end surface at a shoulder-engaging end of the strut or ratchet diametrically opposite the first end surface. The strut or ratchet still further includes an upper face which defines a ramped surface including a convex surface portion which tangentially intersects the first end surface. The convex surface portion is operative to periodically urge the strut or ratchet towards a position characterized by non-abutting engagement of the strut or ratchet with a first member of the assembly upon rotation of the first member in a first direction relative to a second member of the assembly above a predetermined RPM to prevent abutting engagement of the first end surface of the strut or ratchet with a shoulder of the first member.

In at least one embodiment, the strut or ratchet and notch geometry are uniquely designed so that the strut or ratchet "ratchets" during this overrun condition. The strut or ratchet will not engage until notch plate speed drops below a predetermined speed such as 200 RPM.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 7:
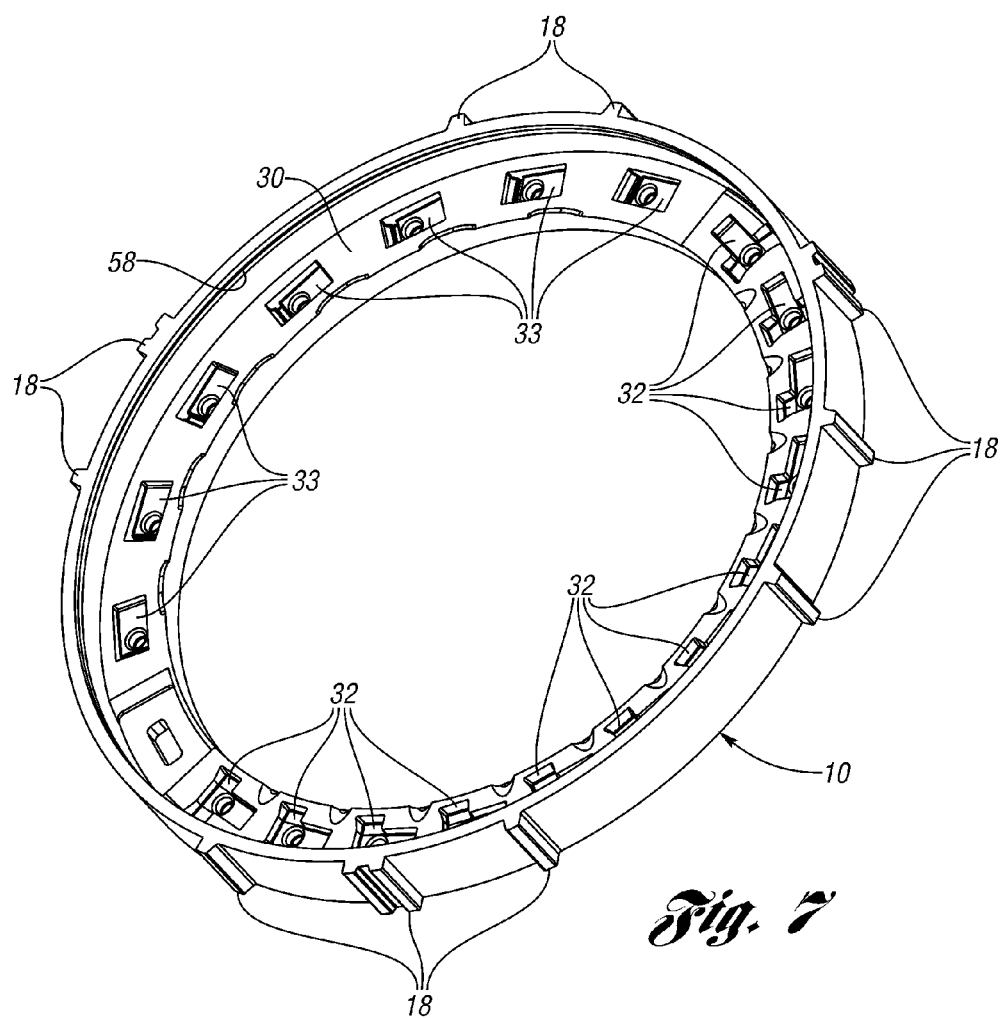
FIG. 7 is a perspective view of a pocket plate of the assembly and illustrating a coupling face of the plate.

FIGS. 1-4 and 7 show a pocket member or plate, generally indicated at 10, of a planar or overrunning coupling or clutch assembly constructed in accordance with one embodiment of the present invention. A coupling or notch plate, generally indicated at 14, is nested within the pocket plate 10. The notch plate 14 is to be connected to a part (not shown) via internal splines 16 formed on the notch plate 14, which engage splines on the part. The pocket plate 10 may be provided with external splines or locking members 18 as illustrated in FIG. 7.

Figure 1:
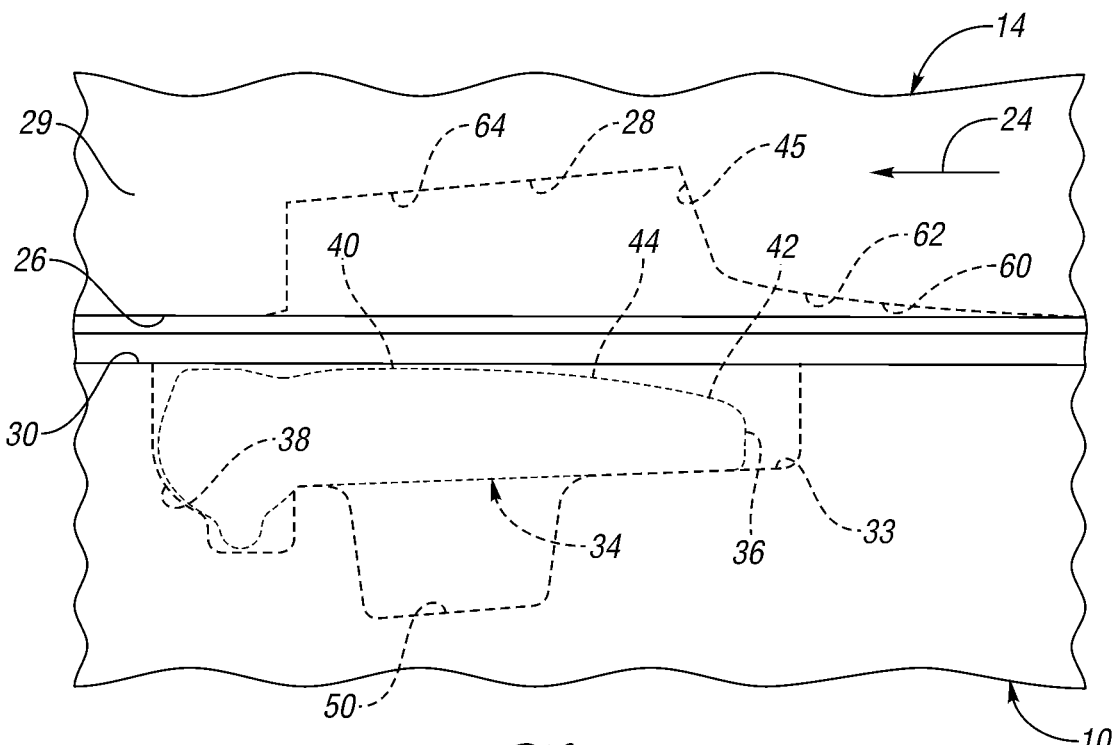
FIG. 1 is a side schematic view, partially broken away, of at least one embodiment of a coupling assembly of the present invention with a strut of the assembly in a non-abutting position in phantom.
Figure 2:
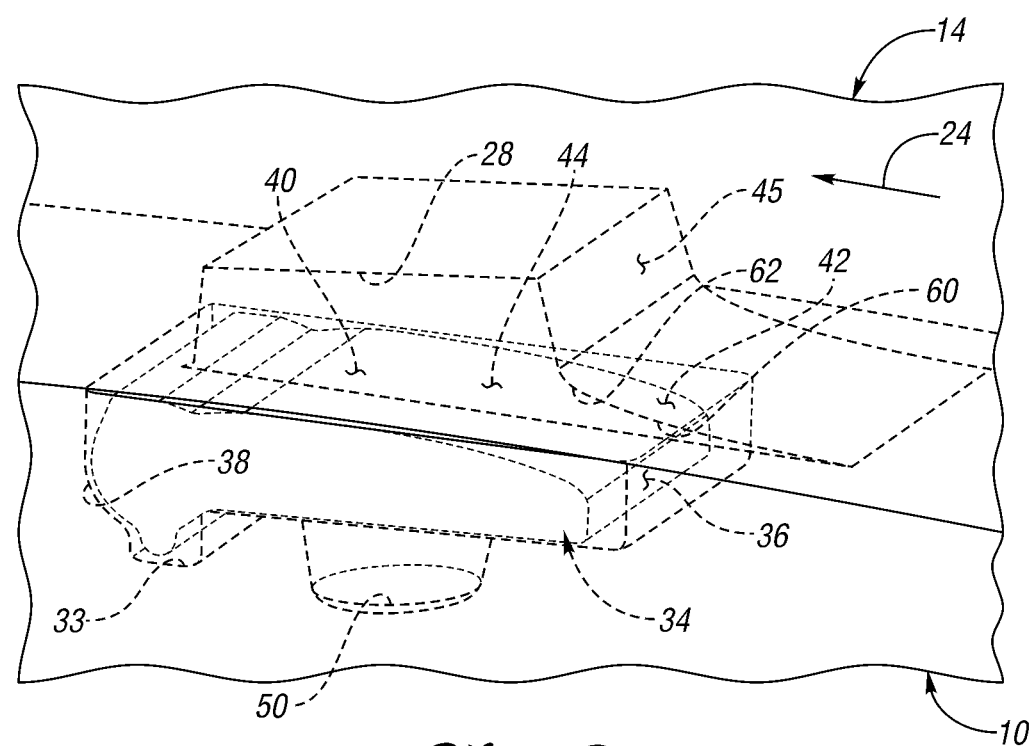
FIG. 2 is a perspective schematic view of the assembly of FIG. 1.
Figure 3:
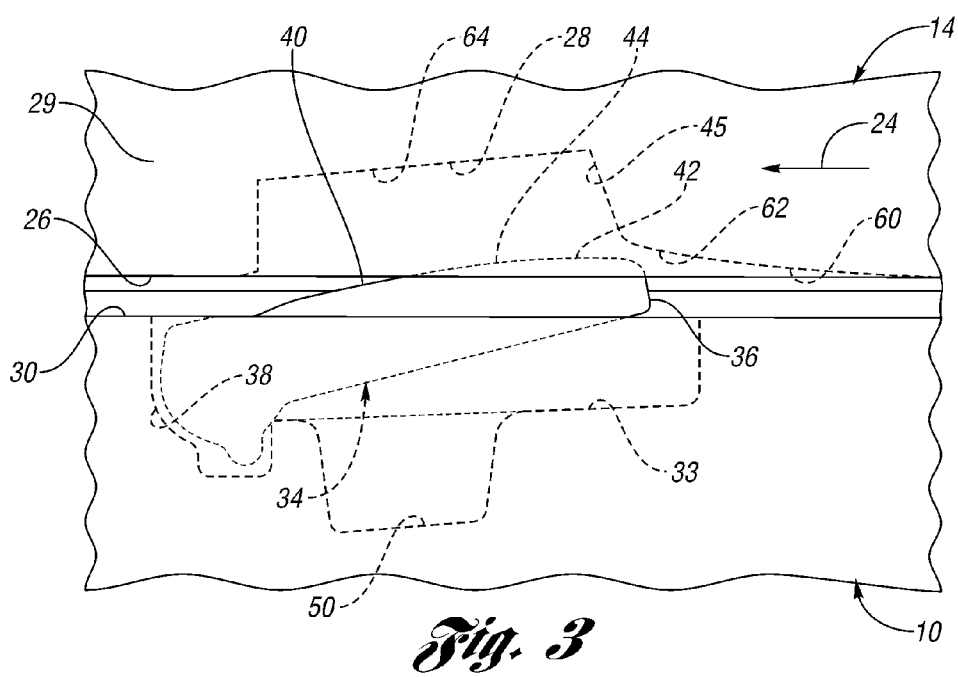
FIG. 3 is a view similar to the view of FIG. 1 with the strut of the assembly ratcheting in an overrun mode of the assembly.
Figure 4:
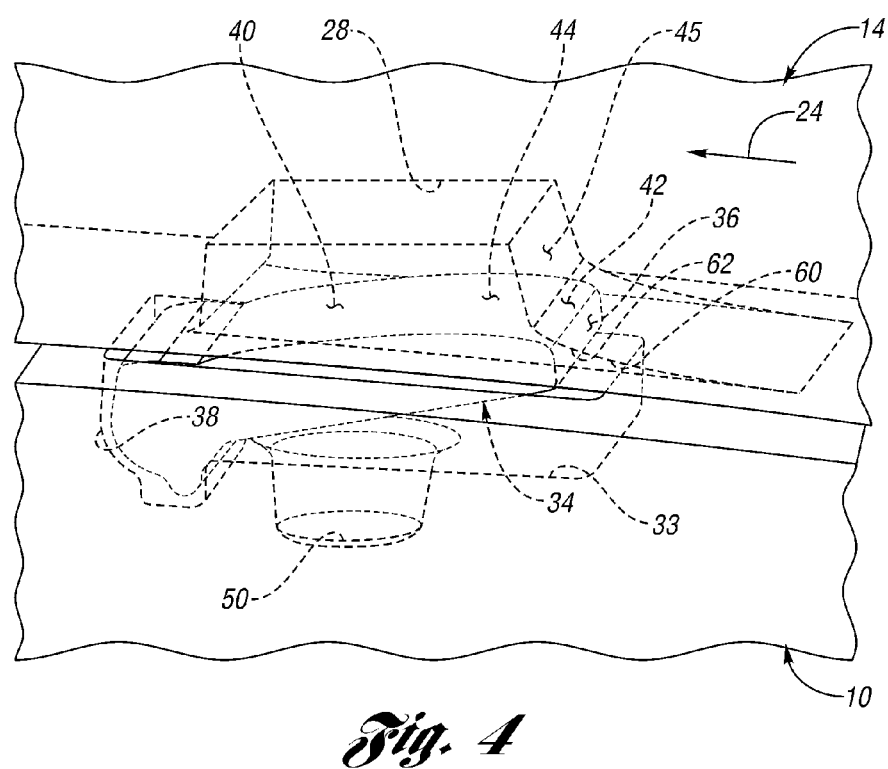
FIG. 4 is a view similar to the view of FIG. 2 with the strut of the assembly ratcheting in the overrun mode of the assembly.
Figure 5:
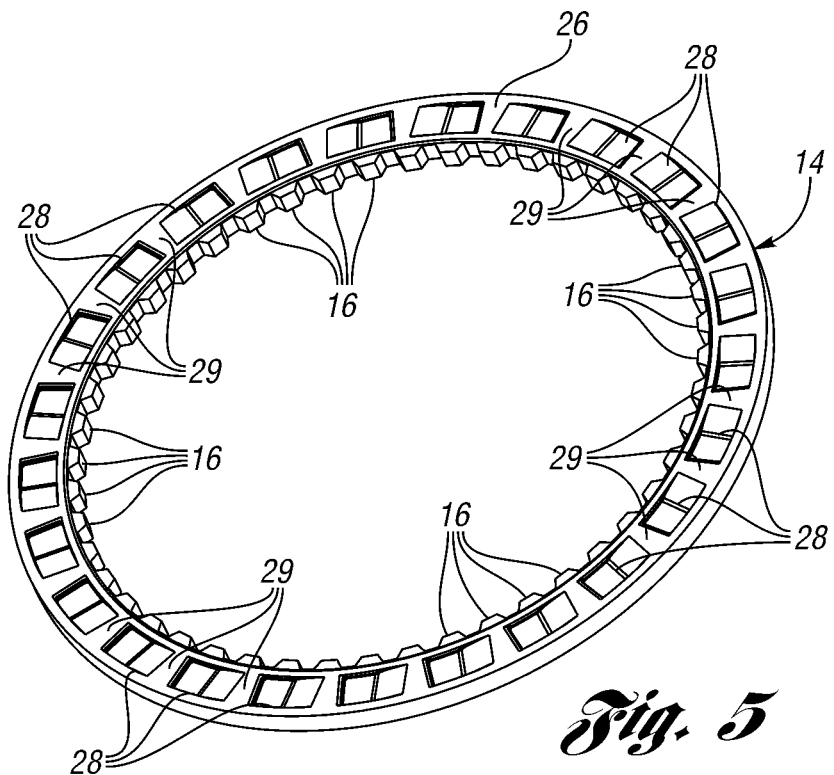
FIG. 5 is a perspective view of a notch plate of the assembly and illustrating a coupling face of the plate.
Figure 6:
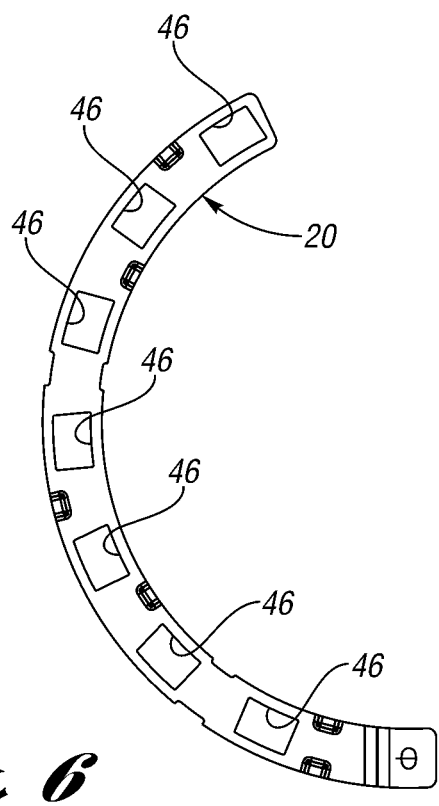
FIG. 6 is a top plan view of a control or selector plate of the assembly.

An actuator (not shown) may be drivably connected to a slide or control element or plate, generally indicated at 20 in FIG. 6, thereby causing the control plate 20 to be adjusted angularly with respect to a central axis about which at least one of the plates 14 and 20 is rotatable. The control plate 20 is disposed between the plates 10 and 14 for limited angular rotation relative to the plates 10 and 14, as generally illustrated in U.S. Pat. No. 7,344,010.

The control element or plate 20 is typically not a full circular part thereby requiring less material to manufacture the part. Hence, the parts 10, 14 and 20 can be nested closer together during a stamping assembly operation. Also, because the control plate 20 is not fully circular, it is easier to install into the clutch.

The plate 14 can free-wheel in one angular direction as indicated by arrow 24 about the central axis relative to the plate 10. The one-directional, free-wheeling motion is achieved in an operating mode when the actuator adjusts the angular position of the control plate 20 relative to the pocket plate 10 (such as via a fork) about the central axis to a forward position which is obtained by moving the control plate 20 angularly a few degrees (such as 10°) from its reverse position.

The notch plate 14 has an inside or reference surface 26 with one or more notches 28 formed therein and separated by common walls 29. The notch plate 14 is adapted to be received in the pocket plate 10.

The pocket plate 10 has an inside surface 30 with forward recesses 32 and reverse recesses 33 formed in corresponding pawl-holding portions of the plate 10. Located intermediate the inside surfaces 26 and 30 of the plate 14 and the plate 10, respectively, is the control plate 20 (not shown in FIGS. 1-4).

In the first embodiment, there are preferably nineteen struts or pawls received and retained in the nineteen recesses (twelve forward recesses 32 and seven reverse recesses 33) in the pocket plate 10. Twelve of the pawls are "eared" forward pawls (not shown) for transferring torque in a forward direction about the central axis and seven of the pawls are "earless" reverse pawls, generally indicated in phantom at 34, clustered or grouped closely together in a curved row or line for preventing rotation between the members 10 and 14 in the "reverse" direction about the central axis. Each of the "eared" forward struts or pawls include a planar substantially rectangular portion and a pair of ears, as generally shown in U.S. Pat. No. 6,065,576.

Each of the reverse pawls or struts 34 includes a first end surface 36 at a free end of the strut 34. The strut 34 further includes a second end surface 38 at a shoulder-engaging end of the strut 34 diametrically opposite the first end surface 36. The strut 34 further includes an upper face 40 which defines a ramped surface 42 including a convex surface portion 44 which tangentially intersects the first end surface 36. Preferably, the strut 34 has an ellipsoid shape at the convex surface portion 44. The convex surface portion 44 is operative to periodically urge the strut 34 towards a position characterized by non-abutting engagement of the strut 34 with the first member 14 of the assembly upon rotation of the first member 14 in the first direction (indicated by arrow 24) relative to the second member 10 of the assembly above a predetermined RPM to prevent abutting engagement of the first end surface 36 of the strut 34 with a shoulder 45 of the first member 14.

When the control plate 20 is situated in its "forward" position it covers the "reverse" set of clustered pawls or struts 34. When the control plate 20 is situated in the "reverse" position it does not cover the "reverse" set of clustered struts 34. When uncovered, the "reverse" struts 34 are allowed to ratchet above a predetermined RPM of the member 14 relative to the member 10. Below the predetermined RPM (such as about 200 RPM) the reverse struts 34 prevent rotation between the pocket plate 10 and notch plate 14 in the "reverse" direction (indicated by arrow 34).

As shown in FIG. 6, the control plate 20 is provided with seven clustered or grouped apertures 46. These are spaced and arranged angularly about the central axis. When the control plate 20 is appropriately positioned in a "reverse" position, one aperture 46 will be disposed directly over each recess 33.

The apertures 46 and the notches 28 are sized so that the portions of the reverse pawls 34 can enter notches 28 of pawl-receiving portions of the notch plate 14 and engage shoulders 45 of the notches 28 to establish a locking action between the reverse pawls 34 and the plate 14 that will prevent rotation between the plate 14 and the plate 10.

If the control plate 20 is rotated to a different (i.e. forward) angular position from the reverse position, the reverse pawls 34 rotate downwardly into their recesses 33 and will be at least partially covered by the control plate 20 and prevented from moving pivotally upward. When the control plate 20 is thus positioned, the plate 14 can free-wheel about the central axis with respect to the plate 10.

The "eared" forward pawls are not covered by the control plate 20 but only by the notch plate 14. The forward pawls typically may rotate outwardly while being partially held by the notch plate 14.

Although any suitable strut spring can be used with one embodiment of the invention, a coil spring (not shown) is located under each of the forward pawls and reverse pawls 34 within recesses 50 formed in the recesses 32 and 33.

When the notch plate 14 is received within or nested within the pocket plate 10 with the control plate 20 therebetween, the plates 10 and 14 are typically held axially fast by a retainer ring or snap-ring (not shown). The snap-ring is received and retained in a groove 58 formed in the plate 10, the groove 58 being best seen in FIG. 7. When assembled, the control plate 20 is located within an annular groove formed in the pocket plate 10.

Also as seen in FIGS. 1-4, each recess 28 in the notch member's clutch face or reference surface 26 also defines a ramped surface 60 positioned adjacent the load-bearing shoulder 45. The ramped surface 60 includes a convex surface portion 62 that tangentially intersects the reference surface 26 of the plate or member 14. Preferably, the shape of the notch tips or convex surface portions 62 are ellipsoids. The convex surface portion 62 of each of the recesses 28 is operative, upon rotation of the plate or member 14 in the rotational direction 24 relative to the plate or member 10 to periodically urge each reverse strut 34 toward the position shown in FIGS. 1 and 2. More specifically, the convex surface portion 62 forms a camming surface that operates to urge each strut 24 toward the position of FIGS. 1 and 2 during clutch overrun.

In other words, the engagement of the convex surface portions 62 of the ramped surfaces 60 of the plate or member 14 prevents a given strut 34 from "tipping into" a given recess 28 as the plate or member 12 rotates in the first direction 24 relative to the driven member 14 above a predetermined RPM of the member 12 relative to the member 10. It will be appreciated that the convex surface portion 62 of the ramped surfaces 60 of the plate or member 14 are formed by any suitable manner, for example, as a "coined-in" or a "cast-in" feature, or as a "tooled-in" feature, as appropriate.

The ramped surface 60 of each of the member's recesses 28 includes a flat surface portion which forms the shoulder 45 that also tangentially intersects the convex surface portion 62. Each recess 28 of the plate or member 14 preferably also includes a base surface 64 adjacent the shoulder or flat surface portion 45 of the ramped surface 60.

The reverse struts 34 may be formed from a length of thin, cold-formed stock material, such as a cold-drawn or cold-rolled wire of spheroidized and annealed SAE 1065 steel. Each strut 34 may be tumbled to achieve a suitable edge/corner break, such as a maximum of 0.015 inches; hardened at 1550° F.; oil quenched; and tempered at 350° F. to a minimum hardness of 53 Rockwell-C.

It is to be understood that instead of the coupling assembly disclosed above, a second embodiment coupling assembly having radial ratchets may also be provided wherein the shape of the radial ratchets and notch tips are preferably ellipsoids as in the first embodiment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling assembly having an overrun mode, the assembly comprising:
    first and second members including first and second coupling faces, respectively, in close-spaced opposition with one another, the first coupling face defining a reference surface, wherein at least one of the members is mounted for rotation about an axis, the first coupling face having a plurality of recesses, each of the recesses defining a load-bearing first shoulder and a ramped surface adjacent the first shoulder, the ramped surface including a convex surface portion that tangentially intersects the reference surface and that tangentially intersects the first shoulder, the second coupling face having at least one recess defining a load-bearing second shoulder;
    a reverse strut or radial ratchet disposed between the coupling faces of the members, the strut or ratchet being movable between first and second positions, the first position being characterized by abutting engagement of the strut or ratchet with a respective shoulder of each member and the second position being characterized by a non-abutting engagement of the strut or ratchet with at least one of the members; and
    a control element mounted for controlled movement between the coupling faces and operable to control position of the strut or ratchet, the control element having at least one opening which extends completely therethrough to allow the strut or ratchet to extend therethrough to the first position in a control position of the control element, the convex surface portions being operative to periodically urge the strut or ratchet towards the second position upon rotation of the first member in a first direction relative to the second member above a predetermined RPM to prevent the abutting engagement of the strut or ratchet in the overrun mode.

2. The assembly as claimed in claim 1, wherein the reference surface is generally normal to the axis.

3. The assembly as claimed in claim 1, wherein the load-bearing first shoulder of each recess of the first member tangentially intersect its corresponding convex surface portion.

4. The assembly as claim in claim 1 wherein one of the members is a notch plate and the other of the members is a pocket plate.

5. The assembly as claimed in claim 1, wherein the assembly is a controllable or selectable one-way clutch assembly.

6. The assembly as claimed in claim 1, wherein the predetermined RPM is about 200 RPM.

7. The assembly as claimed in claim 1, wherein the control element is a control or selector plate rotatable about the axis.

8. A coupling assembly having an overrun mode, the assembly comprising:
    first and second members including first and second coupling faces, respectively, in close-spaced opposition with one another, the first coupling face defining a reference surface, at least one of the members being mounted for rotation about an axis, the first coupling face having a plurality of recesses, wherein each of the recesses defines a load-bearing first shoulder and a ramped surface adjacent the first shoulder, the ramped surface including a convex surface portion that tangentially intersects the reference surface and that tangentially intersects the first shoulder, the second coupling face having at least one recess defining a load-bearing second shoulder; and
    a strut or radial ratchet disposed between the coupling faces of the members, the strut or ratchet being movable between first and second positions, the first position being characterized by abutting engagement of the strut or ratchet with a respective shoulder of each member, the second position being characterized by a non-abutting engagement of the strut or ratchet with at least one of the members, the convex surface portions being operative to periodically urge the strut or ratchet towards the second position upon rotation of the first member in a first direction relative to the second member above a predetermined RPM to prevent the abutting engagement of the strut or ratchet in the overrun mode.

9. The assembly as claimed in claim 8, wherein one of the members is a notch plate and the other of the members is a pocket plate.

10. The assembly as claimed in claim 8, wherein the assembly is a one-way clutch assembly.

11. The assembly as claimed in claim 8, wherein the predetermined RPM is about 200 RPM.

12. A coupling assembly having an overrun mode, the assembly comprising:
    first and second members including first and second coupling faces, respectively, in close-spaced opposition with one another, the first coupling face defining a reference surface, at least one of the members being mounted for rotation about an axis, the first coupling face having a plurality of recesses, each of the recesses defining a load-bearing first shoulder and a ramped surface adjacent the first shoulder, the ramped surface including a convex surface portion that tangentially intersects the reference surface and that tangentially intersects the first shoulder, the second coupling face having at least one recess defining a load-bearing second shoulder; and
    a reverse strut or radial ratchet disposed between the coupling faces of the members, the strut or ratchet being movable between first and second positions, the first position being characterized by abutting engagement of the strut or ratchet with a respective shoulder of each member, the second position being characterized by a non-abutting engagement of the strut or ratchet with at least one of the members, the strut or ratchet including a first end surface at a free end of the strut or ratchet, a second end surface at a shoulder-engaging end of the strut or ratchet diametrically opposite the first end surface and an upper face which defines a ramped surface including a convex surface portion which tangentially intersects the first end surface, wherein the convex surface portions of the first member and the strut or ratchet are operative to periodically urge the strut or ratchet towards the second position upon rotation of the first member in a first direction relative to the second member above a predetermined RPM to prevent abutting engagement of the first end surface of the strut or ratchet with the shoulder of the first member in the overrun mode.

* * * * *